(12) United States Patent
Chen et al.

(10) Patent No.: US 9,887,863 B2
(45) Date of Patent: Feb. 6, 2018

(54) TRANSCEIVER GROUP AND ASSOCIATED ROUTER

(71) Applicant: TAIWAN SEMICONDUCTOR MANUFACTURING COMPANY LTD., Hsinchu (TW)

(72) Inventors: Huan-Neng Chen, Taichung (TW); William Wu Shen, Hsinchu (TW); Lan-Chou Cho, Hsinchu (TW); Feng Wei Kuo, Hsinchu (TW); Chewn-Pu Jou, Hsinchu (TW); Tze-Chiang Huang, Saratoga, CA (US); Jack Liu, Taipei (TW); Yun-Han Lee, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 14/885,352

(22) Filed: Oct. 16, 2015

(65) Prior Publication Data

US 2017/0111193 A1   Apr. 20, 2017

(51) Int. Cl.

| | |
|---|---|
| *H04B 1/00* | (2006.01) |
| *G01S 3/02* | (2006.01) |
| *H04L 27/00* | (2006.01) |
| *H04B 10/40* | (2013.01) |
| *H04B 1/40* | (2015.01) |
| *H04L 27/36* | (2006.01) |

(Continued)

(52) U.S. Cl.
CPC .......... *H04L 27/0002* (2013.01); *H04B 1/40* (2013.01); *H04B 10/40* (2013.01); *H04L 5/06* (2013.01); *H04L 27/365* (2013.01); *H04L 27/38* (2013.01); *H04L 2027/0022* (2013.01)

(58) Field of Classification Search
CPC . H04B 1/40; H04B 1/44; H04B 17/21; H04B 1/3838; H04B 10/40; H04B 1/38
USPC .......................................... 375/142; 342/458
See application file for complete search history.

(56) References Cited

U.S. PATENT DOCUMENTS

| | | | | |
|---|---|---|---|---|
| 4,132,989 A | * | 1/1979 | Frosch .................. | G01S 7/2806 342/189 |
| 4,758,838 A | * | 7/1988 | Maeda ................ | G01S 13/9011 342/196 |

(Continued)

*Primary Examiner* — Daniel Washburn
*Assistant Examiner* — Sarah Hassan
(74) *Attorney, Agent, or Firm* — WPAT, P.C., Intellectual Property Attorneys; Anthony King

(57) ABSTRACT

A transceiver group includes a plurality of transceivers; wherein the transceiver group performs transmission and receiving through a wire, and each of the transceivers includes a transmitter and a receiver, and the transmitter includes: a carrier generator arranged to generate a plurality of carriers having different frequencies for a plurality of data streams to be transmitted; a modulator, coupled to the data streams to be transmitted and the carrier generator, to generate a plurality of modulated data streams carried on the plurality of carriers; and a summer arranged to merge the plurality of modulated data streams to an output signal to the wire; and the receiver includes: a carrier generator arranged to generate a plurality of carriers having different frequencies for an input signal received from the wire; and a demodulator, coupled to the input signal and the carrier generator, to generate a plurality of demodulated data streams.

20 Claims, 16 Drawing Sheets

(51) Int. Cl.
*H04L 27/38* (2006.01)
*H04L 5/06* (2006.01)

(56) References Cited

U.S. PATENT DOCUMENTS

| | | | | |
|---|---|---|---|---|
| 6,885,697 | B1* | 4/2005 | Tokunaga | H04L 5/143 |
| | | | | 370/329 |
| 6,952,440 | B1* | 10/2005 | Underbrink | H04B 1/7077 |
| | | | | 375/142 |
| 7,234,937 | B2* | 6/2007 | Sachdeva | A61C 7/00 |
| | | | | 433/24 |
| 2002/0080070 | A1* | 6/2002 | Harles | G01S 13/325 |
| | | | | 342/458 |
| 2003/0015396 | A1* | 1/2003 | Mennie | G06M 7/06 |
| | | | | 194/206 |
| 2004/0101167 | A1* | 5/2004 | Thal | G01S 11/12 |
| | | | | 382/107 |
| 2004/0203472 | A1* | 10/2004 | Chien | H04B 1/30 |
| | | | | 455/68 |
| 2005/0034540 | A1* | 2/2005 | Juranitch | G01M 13/02 |
| | | | | 73/862.322 |
| 2008/0097428 | A1* | 4/2008 | Khashayar | A61F 9/00736 |
| | | | | 606/42 |
| 2010/0220012 | A1* | 9/2010 | Reede | G01S 5/0289 |
| | | | | 342/387 |
| 2012/0124257 | A1* | 5/2012 | Wu | H01L 25/18 |
| | | | | 710/106 |

\* cited by examiner

TRANSCEIVER GROUP AND ASSOCIATED ROUTER

BACKGROUND

As microprocessors computer memory, communications interfaces and other devices increase in speed, the connections between these discrete devices, via a high-speed communication bus also must increase in speed and throughput. As with most components, for high speed parallel bus transmission, power consumption and transition time are the major concerns. With wide parallel bus transmission, the power summation of each signal unit is large and the transmission speed is limited by transition time. A faster transition time results in higher transmission speeds.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
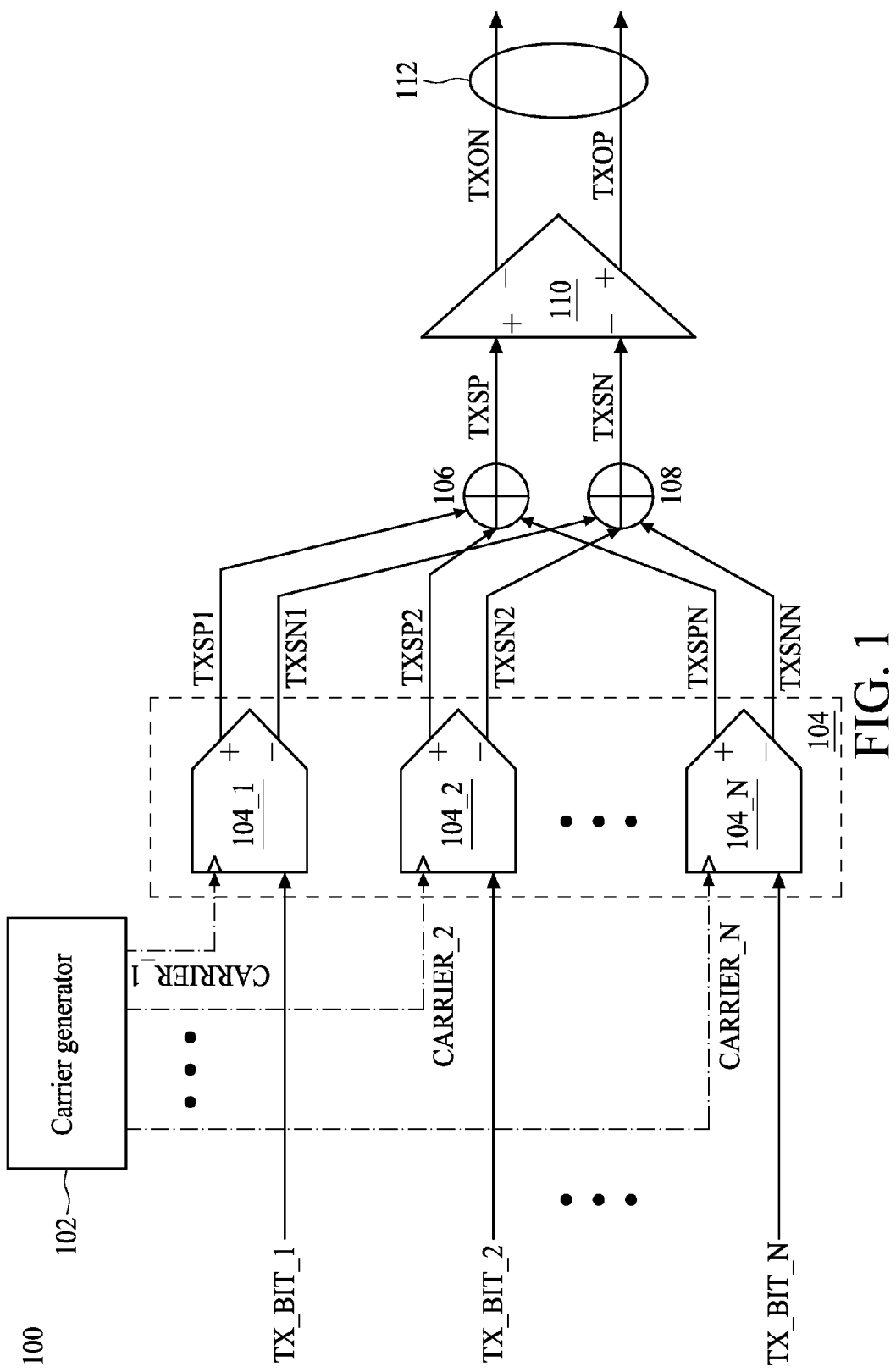
FIG. 1 is a schematic view illustrating a transmitter according to an exemplary embodiment of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic view illustrating a transmitter 100 according to an exemplary embodiment of the present disclosure. Briefly, the transmitter 100 includes a carrier generator 102, a modulator 104, summers 106, 108, and an amplifier 110.

The transmitter 100 receives input data streams TX_BIT_1-TX_BIT_N desired to be transmitted, wherein N is an integer greater than 1. The input data streams TX_BIT_1-TX_BIT_N in conjunction with carriers CARRIER_1-CARRIER_N produced by the carrier generator 102 are input to the modulator 104. In this embodiment, each of the carriers CARRIER_1-CARRIER_N may have a distinct frequency or a distinct phase. In addition, the frequencies of the carriers CARRIER_1-CARRIER_N are at least greater than twice frequencies of the input data streams TX_BIT_1-TX_BIT_N as called Nyquist-Shannon sampling theorem. In some embodiments, the frequencies of the carriers CARRIER_2-CARRIER_N may be a multiple of the frequency of the carrier CARRIER_1.

The modulator 104 may operatively perform a Quadrature Amplitude Modulation (QAM) based on the input data streams TX_BIT_1-TX_BIT_N and the carriers CARRIER_1-CARRIER_N. In some embodiments, the QAM may be a high level QAM, e.g., 64 QAM, comprised of a complex QAM signal constellation. Specifically, the modulator 104 includes sub-modulators 104_1-104_N for modulation of the input data streams TX_BIT_1-TX_BIT_N respectively. Each of the sub-modulators modulators 104_1-104_N outputs a positive portion and a negative portion of the modulated signal output therefrom. As shown in FIG. 1, the sub-modulators 104_1 produces a positive signal TXSP1 and a negative signal TXSN1, the sub-modulators 104_2 produces a positive signal TXSP2 and a negative signal TXSN2, and so on.

All the positive signals TXSP1-TXSPN are brought together and summed by the summer 106; and all the negative signals TXSN1-TXSNN are brought together and summed by the summer 108. Thereafter, the summed positive signal TXSP and the summed negative signal TXSN are amplified by the amplifier 110 to generate a pair of output differential signal pair TXON and TXOP. The output differential signal pair TXON and TXOP may be transmitted to a remote receiving end through a differential transmission line pair 112.

Figure 2:
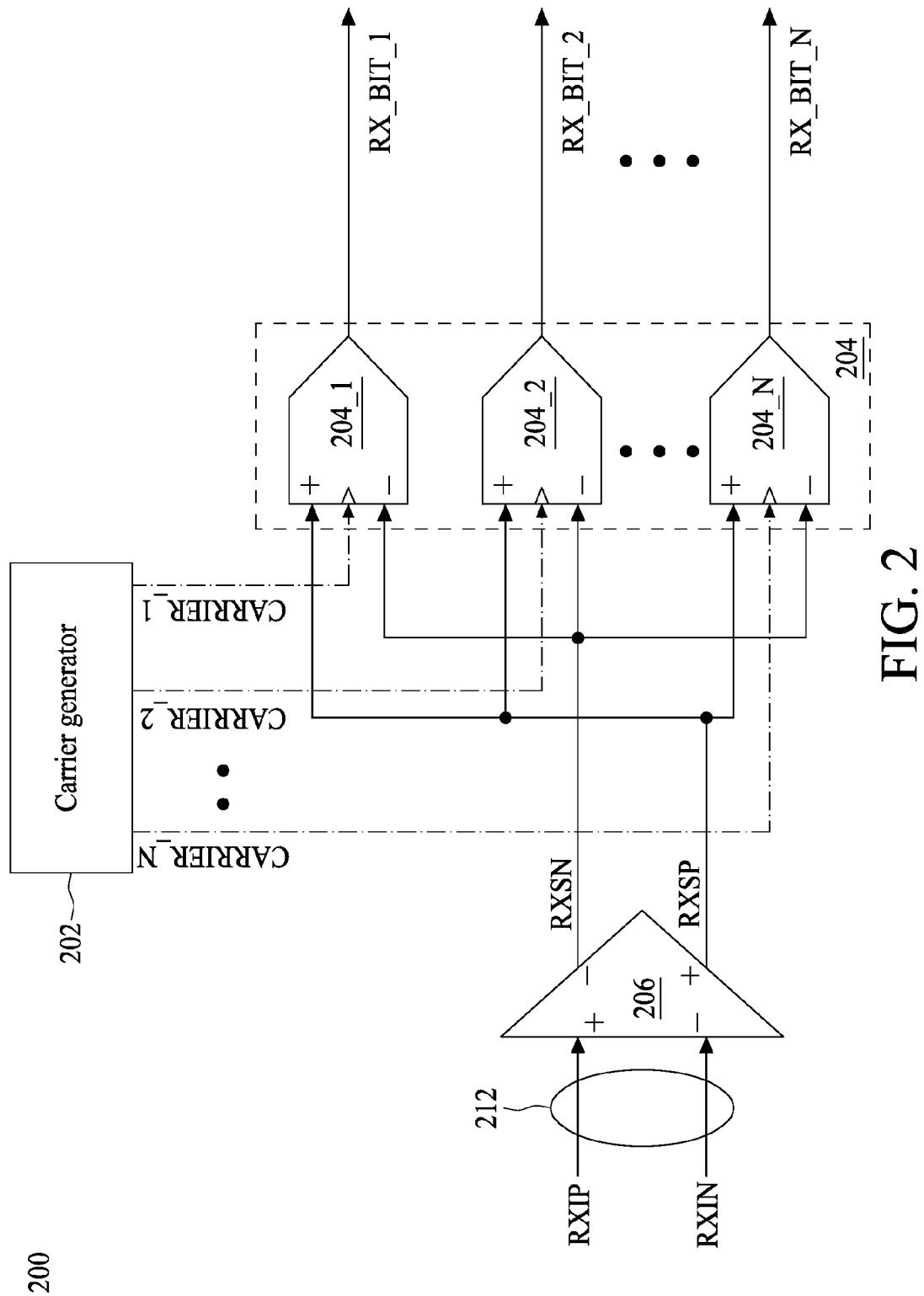
FIG. 2 is a schematic view illustrating a receiver according to an exemplary embodiment of the present disclosure.

The N-bit input data stream carried on the N different carriers CARRIER_1-CARRIER_N can be recovered by a corresponding receiver comprised of receiving paths corresponding to the transmission paths shown in FIG. 1. FIG. 2 is a schematic view illustrating a receiver 200 according to an exemplary embodiment of the present disclosure. Briefly, the receiver 200 corresponds to the transmitter 100. The receiver 200 includes an amplifier 206, a carrier generator 202 and a demodulator 204.

When the differential transmission line pair 212 is coupled to the the differential transmission line pair 112, the differential signal pair TXON and TXOP output from transmitter 100 is fed into the receiver 200 via the differential transmission line pairs 112 and 212. Specifically, the differential signal pair TXON and TXOP is coupled to a differential received signal pair RXIN and RXIP and input to the amplifier 206. Amplified differential received signal pair RXSN and RXSP along with carriers CARRIER_1-CARRIER_N generated by the carrier generator 202 are input to the demodulator 204. As can be seen from FIG. 2, data streams RX_BIT_1-RX_BIT_N are unloaded from its respective carrier by a corresponding sub-demodulator. Specifically, the data stream RX_BIT_1 is recovered from the amplified differential signal pair RXSN and RXSP by a demodulation operation with respect to the carrier CARRIER_1; the data stream RX_BIT_2 is recovered from the amplified differential received signal pair RXSN and RXSP by a demodulation operation with respect to the carrier CARRIER_2, and so on.

Figure 3:
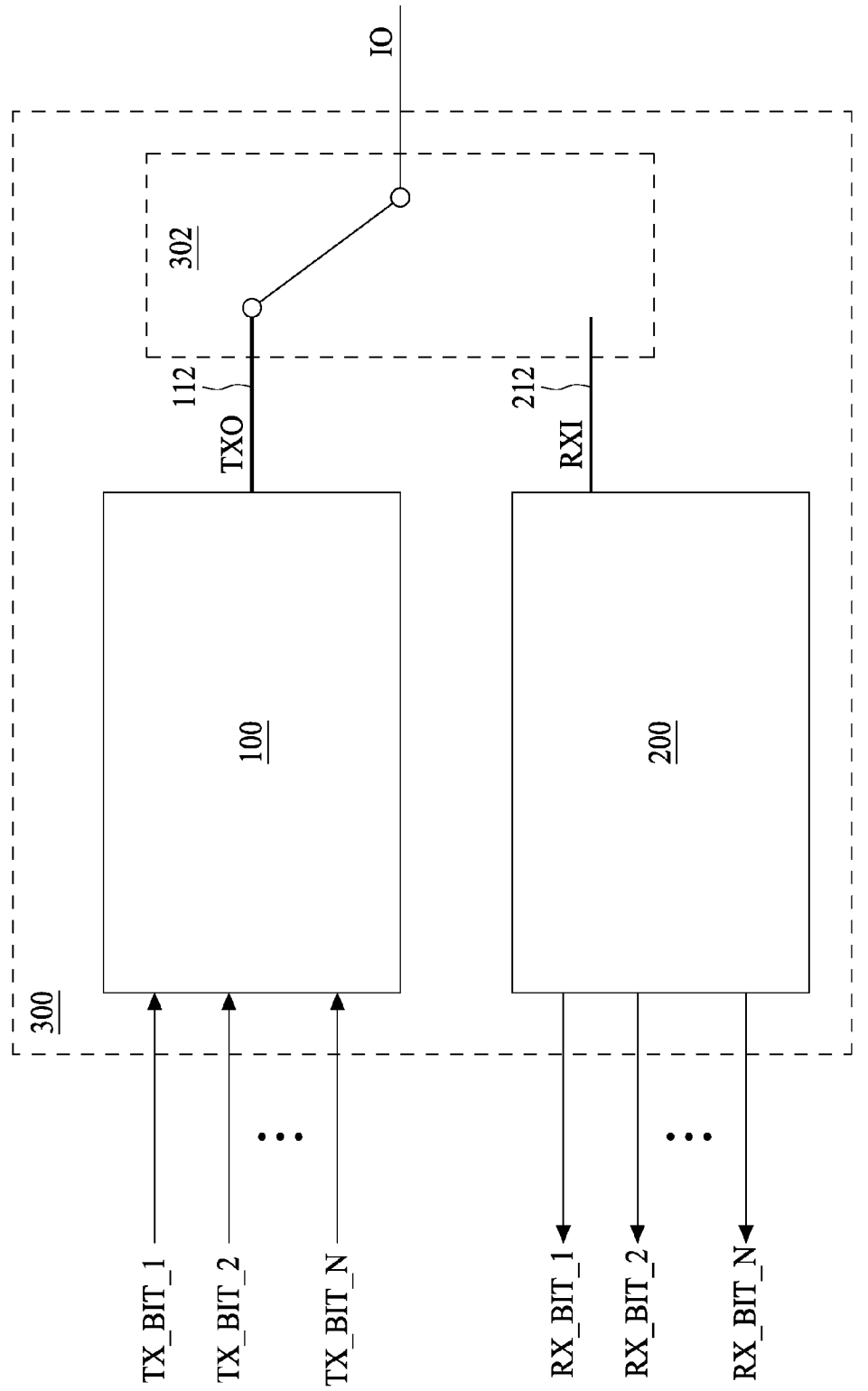
FIG. 3 is a schematic view illustrating a transceiver according to an exemplary embodiment of the present disclosure.

FIG. 3 is a schematic view illustrating a transceiver 300 according to an exemplary embodiment of the present disclosure. The transceiver 300 is comprised of the transmitter 100, the receiver 200 and a switch 302. In this embodiment, the transceiver 300 operates in a half-duplex mode. The switch 302 selectively couples the transmission signal TXD (i.e. the differential signal pair TXON and TXOP) or the received signal RXD (i.e. the differential received signal pair RXSN and RXSP) to an interface signal IO of the transceiver 300 for selecting a transmission or a receiving mode. In the half-duplex operation, communication is one direction at a time. The transceiver 300 can communicate with another transceiver having the same or similar architecture. In order to determine an appropriate operation mode of the transceiver 300, some handshaking mechanism may be performed to obtain a handshaking result before data transmission. The switch 302 therefore may be controlled by an upper layer of the transceiver system in accordance with the handshaking result with the remote transceiver systems. Details associated with the handshaking mechanism will be described in the subsequent paragraphs.

The concept of the transceiver 300 includes using the N distinct carriers CARRIER_1-CARRIER_N and the QAM modulation mechanism to allow for a wider transmission bandwidth on the differential transmission line pair. In this way, more signals can be transmitted at a time to achieve a higher data throughput. Like a prior art Serializer/Deserializer (SerDes) commonly used in high speed communications to compensate for limited input/output (I/O) pins and interconnects, the transceiver 300 can effectively reduce the I/O pins and interconnects; but unlike the prior art SerDes, the proposed transceiver 300 has a smaller transmission frequency bandwidth within each carrier frequency due to the sophisticated modulation mechanism.

Please note that it is not intended for the disclosure to be limited to the examples shown herein. One skilled in the art can apply the principles of the present disclosure to other transceiver applications as well without departing from the scope of the disclosure. In some embodiments, the differential line may be interconnection wires disposed in a single die, or in different dies in a 2.5D, 3D integrated circuit (IC), in different chips mounted on a printed circuit board (PCB), or in an inside package like package-on-package (PoP) or integrated fan-out (InFO). In some embodiments, the transceiver 300 may also be designed as a single-ended system connected to a single line. In some embodiments, the QAM modulation mechanism may be replaced by other type of modulation. In some embodiments, the amplifier 110 may be omitted. In some embodiments, the transceiver 300 may operate in a full duplex mode.

Figure 4:
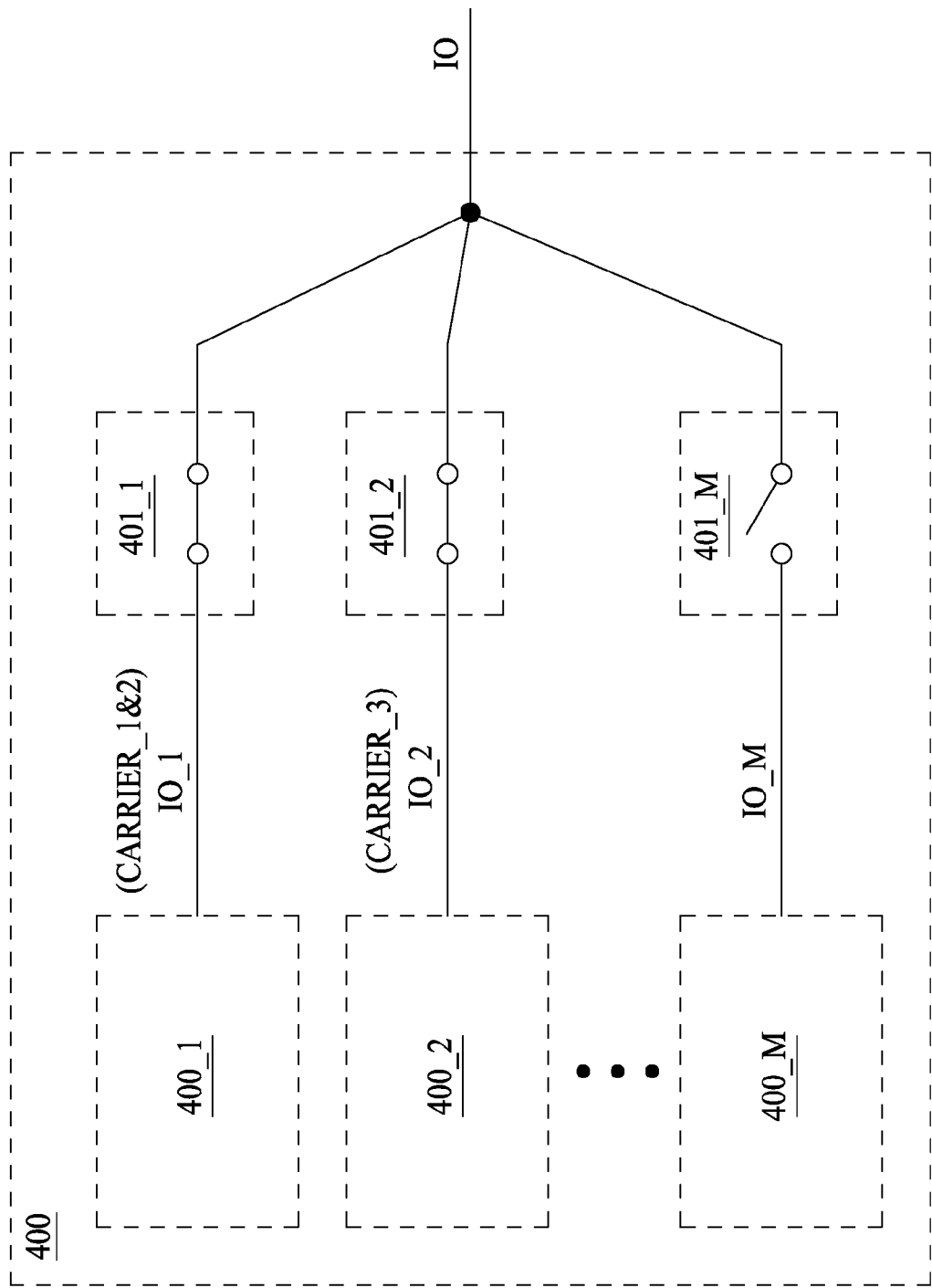
FIG. 4 is a schematic view illustrating a transceiver group according to an exemplary embodiment of the present disclosure.

FIG. 4 is a schematic view illustrating a transceiver group 400 according to an exemplary embodiment of the present disclosure. As the name suggests, the transceiver group 400 is comprised of a plurality of transceivers 400_1-400_M, wherein M is an integer and greater than 1. In this embodiment, each of the transceivers 400_1-400_M may have a same architecture as the transceiver 300. The transceiver group 400 further includes a plurality of switches 401_1-401_M. Each of the transceivers 400_1-400_M is coupled to an interface signal IO of the transceiver group 400 via a corresponding switch which is controlled to turn on or turn off a path to the interface signal IO. Please note that the number of turned-on switches is not limited. For example, at least transceivers 400_1 and 400_2 are capable of communicating with a remote transceiver or transceiver group; but a path between the transceivers 400_M and the remote transceiver or transceiver group are deactivated by the switch 401_M.

When the transceiver group 400 is in a transmission mode, all of the transceivers 400_1 and 400_M are in a transmission mode by controlling a corresponding switch to connect a transmitter in each of the transceivers 400_1 and 400_M with the interface signal IO of the transceiver group 400. The total transmission bandwidth of the transceiver group 400 substantially equals to each of the transmission bandwidth of the transceivers 400_1 and 400_M. As a consequence, input data streams of each transceiver should avoid using the same carrier frequency in order to prevent from signal interference. As shown in FIG. 4, at least the transceivers 400_1 and 400_2 are connected to the interface signal IO of the transceiver group 400, carriers used by the transceivers 400_1 should be different from that used by the transceivers 400_2 or other transceivers also connected to the interface signal IO.

When the transceiver group 400 is in a receiving mode, all of the transceivers 400_1 and 400_M are in a receiving mode by controlling a corresponding switch to connect a receiver in each of the transceivers 400_1 and 400_M with the interface signal IO of the transceiver group 400. By a handshaking mechanism made in advance, each of the switches in the transceiver group 400 is activated or deactivated accordingly, and the input signals are received and demodulated by the corresponding transceivers.

The transceivers 400_1 and 400_M may be disposed in a single die or in different dies, such as dies in a 2.5D or 3D IC, or in an inside package like package-on-package (PoP) or integrated fan-out (InFO). The transceiver group 400 may be used as an interface of a memory block, a processor, or other circuit modules. In some embodiments, when a plurality of memory blocks does not always fully use the bandwidth of the transceiver group 400, the transceivers 400_1 and 400_M of the transceiver group 400 may be allocated to the memory blocks respectively. By appropriate controlling each memory blocks, sharing one transceiver group 400 by the memory blocks can reduce the whole I/O pins and interconnects without unduly affecting the entire data throughput. When a certain memory block requires a higher data bandwidth, the other memory blocks connected to the same transceiver group and not in a busy status can instantly release its bandwidth. As a consequence, the transceiver group 400 provides a more flexible and concise interface design for memory blocks, processors, or other circuit modules.

Figure 5:
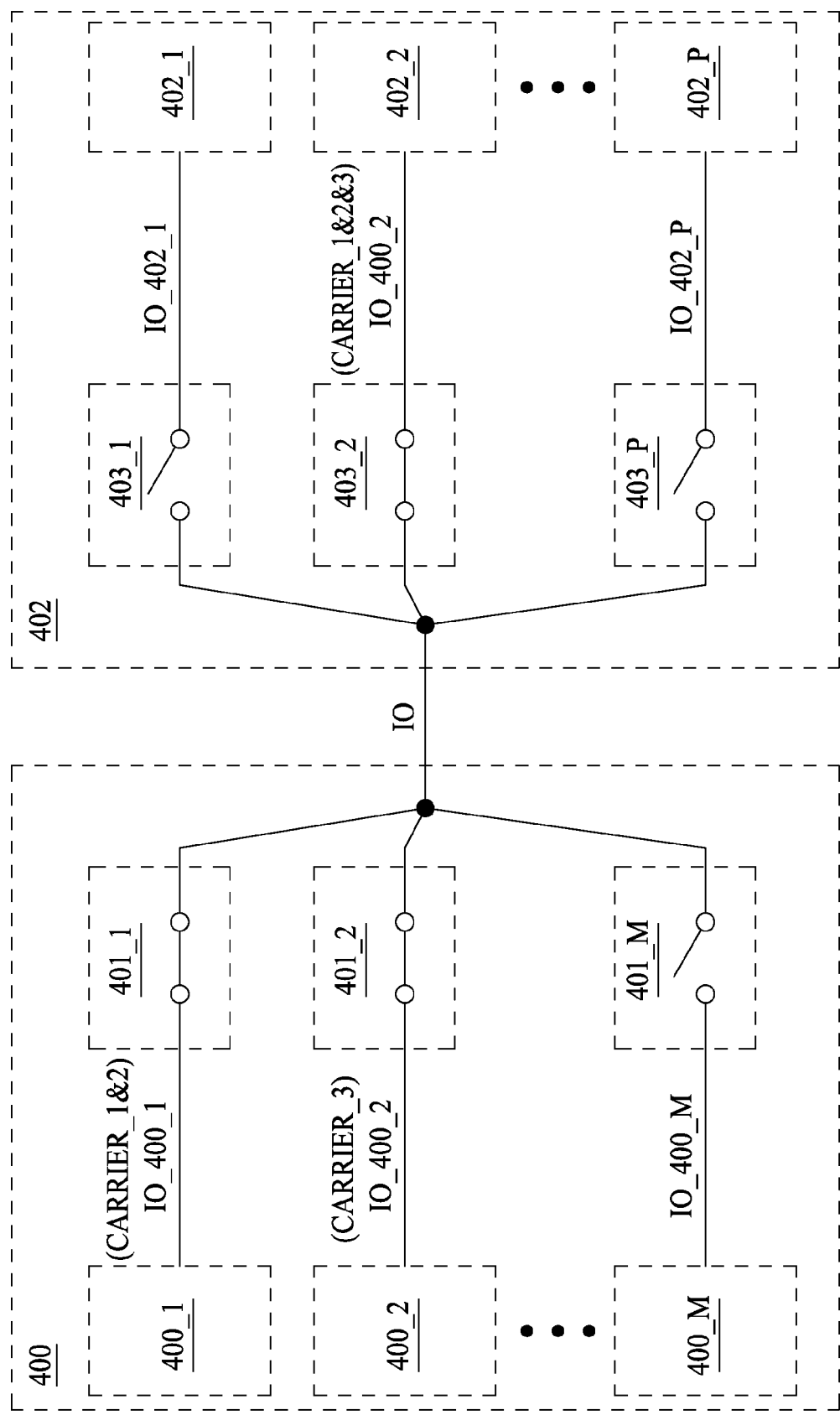
FIG. 5 is a schematic view illustrating the transceiver group connected to another transceiver group according to an exemplary embodiment of the present disclosure.

FIG. 5 is a schematic view illustrating the transceiver group 400 connected to another transceiver group 402 according to an exemplary embodiment of the present disclosure. As can be seen in FIG. 5, the transceiver group 400 of FIG. 4 is connected to the transceiver group 402 via differential or single-ended interconnection wires. The transceiver group 402 includes transceivers 402_1-402_P and switches 403_1-403_P, wherein P is an integer greater than 1. The transceiver groups 400 and 402 may be disposed in a single die, or in different dies in a 2.5D, 3D IC, or in different chips mounted on a PCB. As mentioned above, the transceivers 400_1-400_M of the transceiver groups 400 and the transceivers 402_1-402_P of the transceiver groups 402 may be disposed in the same or different dies or chips.

In FIG. 5, suppose that a first data stream and a second data stream are input to the transceiver 400_1 and modulated by carriers CARRIER_1 and CARRIER_2 respectively; and a third data stream is input to the transceiver 400_2 and modulated by a carrier CARRIER_3. A modulated signal IO_400_1 output from the transceiver 400_1 therefore includes information of the first and second data streams; and a modulated signal IO_400_2 output from the transceiver 400_2 therefore includes information of the third data stream. Suppose that there is no further data stream need to be transmitted through the transceivers 400_3-400_ M. Thus, the switches 401_1-401_2 are activated and the remaining switches 401_3-401_M are deactivated correspondingly. The interface signal IO thus only includes information of the first, second and third data streams.

The transceiver group 402 receives the interface signal IO from the transceiver group 400. In this case, the transceiver 402_2 is used to receive the first, second and third data streams through the interface signal IO from the transceiver group 400. The switch 403_2 is activated only, among the switches 403_1-403_ P. Such a configuration may be a result of hand shaking between the transceiver groups 400 and 402, or may be determined in advance by designers. The first, second and third data streams are then recovered by the transceiver group 402_2. Specifically, the first, second and third data streams are obtained at the output of the submodulators of the transceiver group 402_2 corresponding to the carriers CARRIER_1, CARRIER_2 and CARRIER_3.

Please note that it is not intended for the disclosure to be limited to the examples shown herein. One skilled in the art can apply the principles of the present disclosure to other transceiver applications as well without departing from the scope of the disclosure. In some embodiments, the number of the transceivers in the transceiver group 400 and the transceivers in the transceiver group 402 may be the same, i.e. M=P. In some embodiments, the number of the transceivers in the transceiver group 400 and the transceivers in the transceiver group 402 may be different, i.e. M>P or M<P. In some embodiments, there may be more than two transceiver groups connected to each other via differential or single-ended interconnection wires. Any combinations are feasible through appropriate control to the transceiver group 400 and the transceiver group 402.

Figure 6:
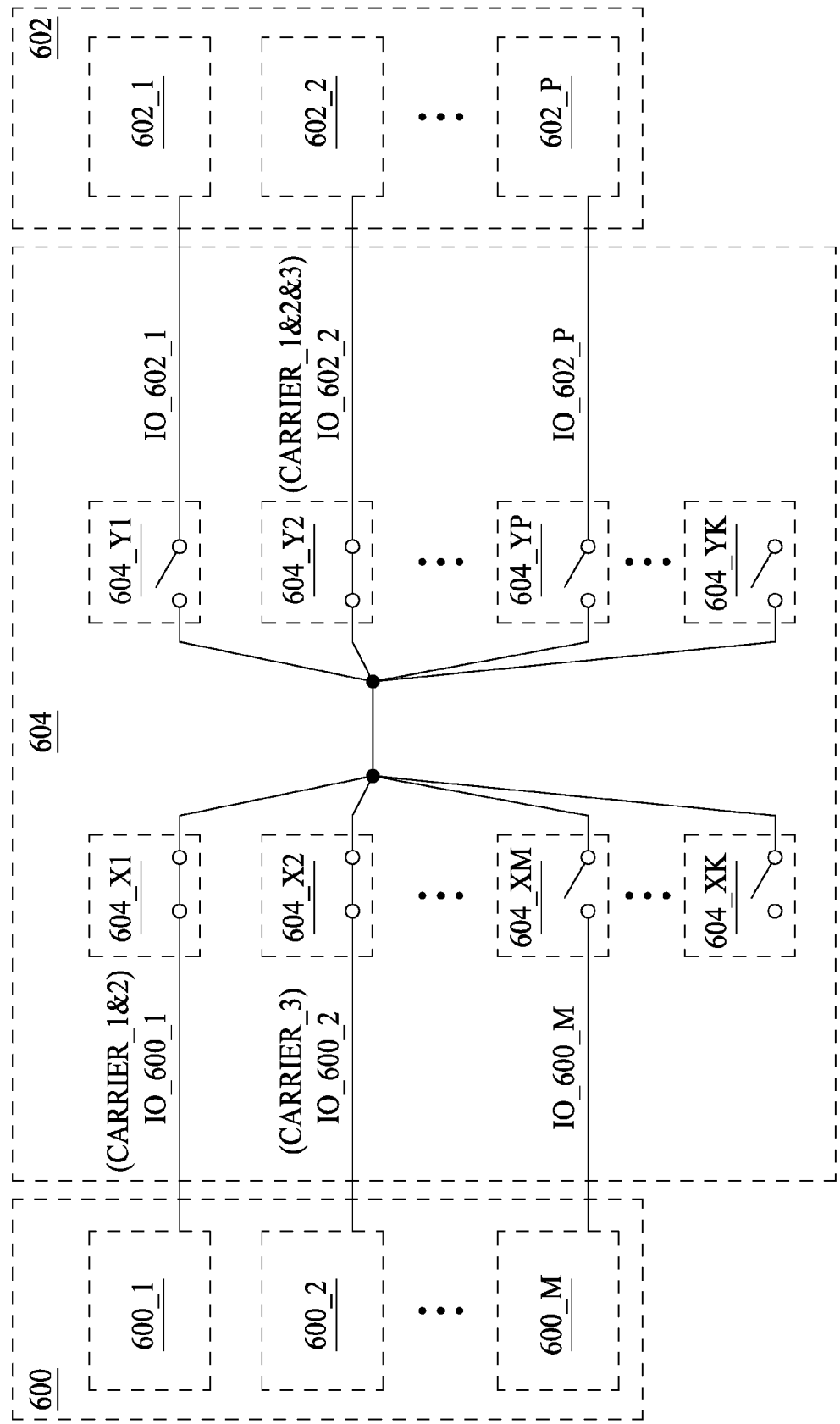
FIG. 6 is a schematic view illustrating a transceiver group connected to another transceiver group through a router according to an exemplary embodiment of the present disclosure.

FIG. 6 is a schematic view illustrating a transceiver group 600 connected to another transceiver group 602 through a router 604 according to an exemplary embodiment of the present disclosure. As can be seen in FIG. 6, a transceiver group 600 is connected to another transceiver group 602 through the K-channel router 604 via differential or single-ended interconnection wires, wherein K is an integer. In this embodiment, K is greater than M and P. Unlike the transceiver group 400, the transceiver group 600 only includes transceivers 600_1-600_M without having switches therein. As such, the transceiver group 600 may be regarded as the transceiver group 400 free of the switches 401_1-401_M.

The architecture of the transceiver group 602 is similar to the architecture of the transceiver group 600. The transceiver group 602 includes transceivers 602_1-602_P. The transceiver groups 600 and 602 may be disposed in a single die, or in different dies in a 2.5D, 3D IC, or in different chips mounted on a PCB. The router 604 includes 2*K switches 604_X1-604_YK all coupled to each other. Each switch in the router 604 can be assigned to an interface signal of the transceiver groups 600 and 602 via differential or single-ended interconnection wires. As shown in FIG. 6, the switches 604_X1-604_XM are coupled to interface signals IO_600_1-IO_600_M of the transceivers 600_1-600_M respectively; and the switches 604_Y1-604_YP are coupled to interface signals IO_602_1-IO_602_P of the transceivers 602_1-602_P respectively.

In FIG. 6, suppose that a first data stream and a second data stream are input to the transceiver 600_1 and modulated by carriers CARRIER_1 and CARRIER_2 respectively; and a third data stream is input to the transceiver 600_2 and modulated by a carrier CARRIER_3. A modulated signal IO_600_1 output from the transceiver 600_1 therefore includes information of the first and second data streams; and a modulated signal IO_600_2 output from the transceiver 600_2 therefore includes information of the third data stream. Suppose that there is no further data stream need to be transmitted through the transceivers 600_3-600_M.

The switches 604_X1-604_X2 of the router 604 are activated to receive the modulated signals IO_600_1 and IO_600_2 from the transceiver group 600. The modulated singles IO_600_1 and IO_600_2 are then merged and received by the transceiver 602_2 through the activated switch 604_Y2. Such a configuration of the router 604 may be a result of hand shaking between the transceiver groups 600 and 602, or may be determined in advance by designers. The first, second and third data streams are then recovered by the transceiver group 602_2. Specifically, the first, second and third data streams are obtained at the output of the sub-modulators of the transceiver group 602_2 corresponding to the carriers CARRIER_1, CARRIER_2 and CARRIER_3.

Please note that it is not intended for the disclosure to be limited to the examples shown herein. One skilled in the art can apply the principles of the present disclosure to other transceiver applications as well without departing from the scope of the disclosure. In some embodiments, the number of the transceivers in the transceiver group 600 and the transceivers in the transceiver group 602 may be the same, i.e. M=P. In some embodiments, the number of the transceivers in the transceiver group 600 and the transceivers in the transceiver group 602 may be different, i.e. M>P or M<P. In some embodiments, there may be more transceiver groups connected to the router through available switches therein, e.g. the switches 604_XM+1-604_XK and 604_YP+1-604_YK. Any other combinations are feasible through appropriate control to the transceiver group 400 and the transceiver group 402.

Figure 7:
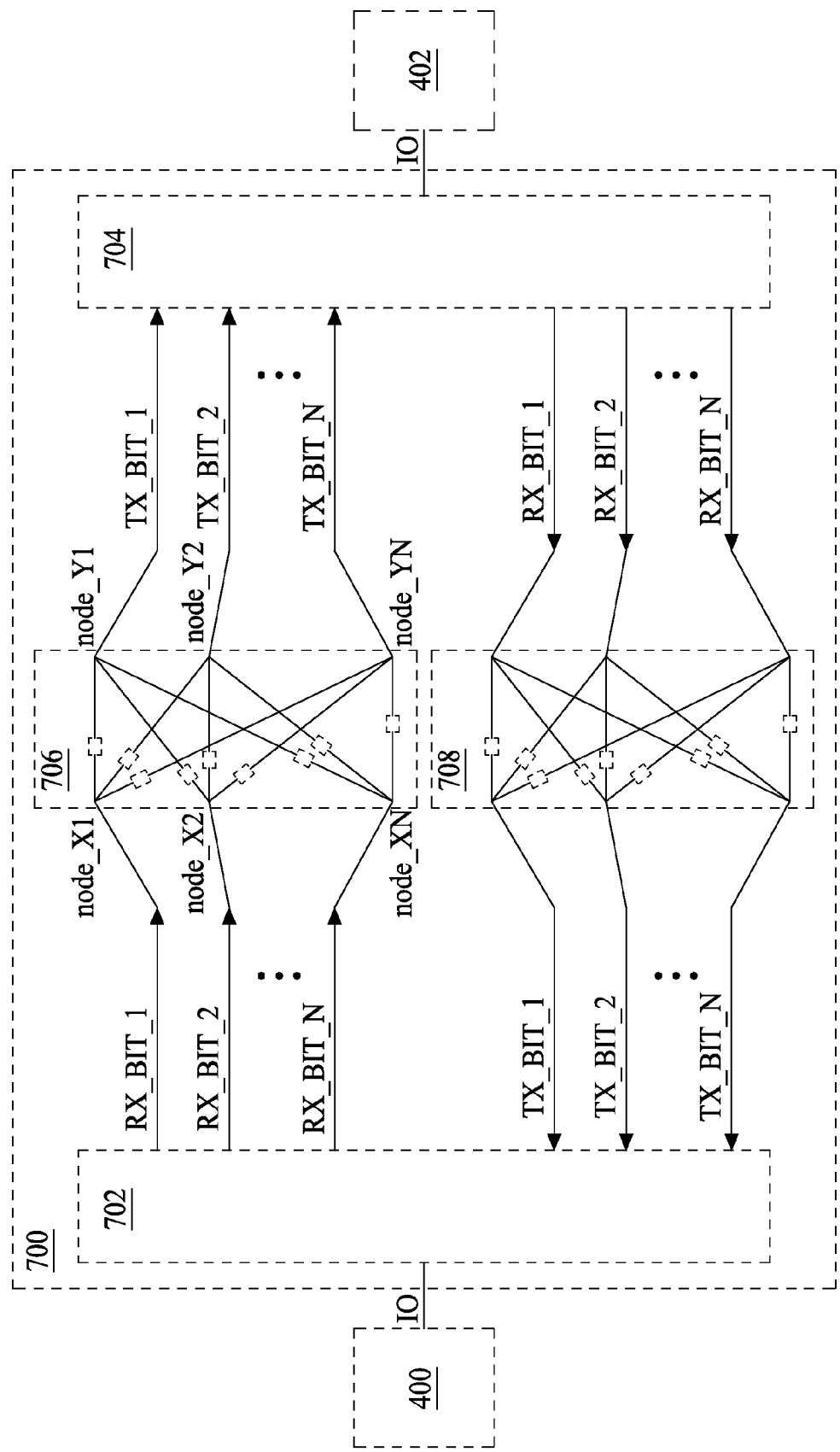
FIG. 7 is a schematic view illustrating a transceiver group connected to another transceiver group through a router according to another exemplary embodiment of the present disclosure.

FIG. 7 is a schematic view illustrating a transceiver group 400 connected to another transceiver group 402 through a router 700 according to another exemplary embodiment of the present disclosure. As can be seen in FIG. 7, the transceiver group 400 of FIG. 4 is connected to another transceiver group 402 via the router 700. The architecture of the transceiver group 402 is similar to the architecture of the transceiver group 400. In this embodiment, the router 700 includes transceivers 702 and 704, and N*N switch matrixes 706 and 708, wherein N is an integer. In this embodiment, N equals to the number of data streams of the full ability of the transceiver groups 400 and 402. The router 700 is a two-port router. However, this is not a limitation of the present disclosure. One skilled in the art can apply the principles of the present disclosure to other router applications as well without departing from the scope of the disclosure. In some embodiments, a router may have more sets of the transceivers 702 and 704 and the N*N switch matrixes 706 and 708 so as to perform a multi-port operation.

The architecture of the transceiver 702 and 704 is similar to the architecture of the transceiver 300. Suppose input data streams need to be transmitted from the transceiver group 400 to the transceiver group 402. The transceiver 702 receives interface signal IO from the transceiver group 400. The transceiver 702 demodulates the interface signal IO received from the transceiver group 400 and generates data streams RX_BIT_1-RX_BIT_N based on the received interface signal IO from the transceiver group 400. The N*N switch matrix 706 includes N*N paths, wherein each path has a switch that can selectively activate or deactivate the corresponding path. The data streams RX_BIT_1-RX_BIT_N are connected to nodes node_X1-node_XN of the N*N switch matrix 706, and can be reallocated by configuration of the N*N switch matrix 706. For example, the RX_BIT_1 may be reassigned to a node node_Y2 by activating the switch on the path between the node_X1 and node_Y2 and deactivating all the remaining paths connected to the node_X1.

When input data streams need to be transmitted from the transceiver group 402 to the transceiver group 400, the other N*N switch matrix 708 may be used for path allocation. In some embodiments, only one of the N*N switch matrix 706 and the N*N switch matrix 708 is employed and both transmission direction can be also achieved by sharing a single of N*N switch matrix.

The router 700 is flexible and useful when the configuration of transceiver groups coupled thereto is complex. Each data stream can be arbitrarily allocated to assigned transceivers in the transceiver groups through the switch matrix.

Figure 8:
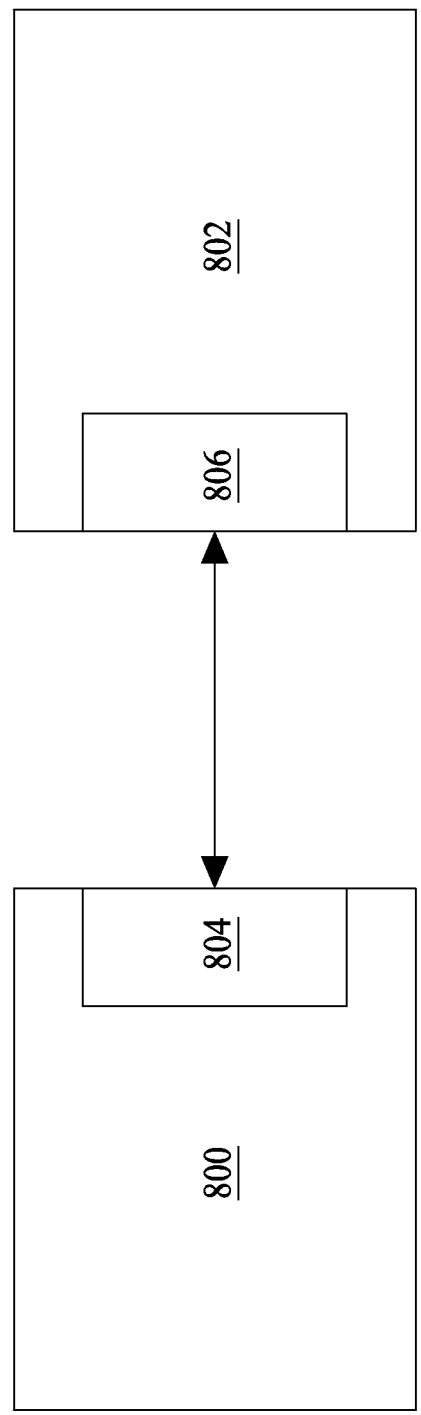
FIG. 8 is a schematic view illustrating a chip communicates with another chip through transceiver groups according to an embodiment of the present disclosure.

FIG. 8 is a schematic view illustrating a chip 800 communicates with another chip 802 through transceiver groups 804 and 806 according to an embodiment of the present disclosure. The chip 800 or 802 may include a memory block, a processor, or other circuit modules. The chip 800 includes the transceiver group 804 coupled to the transceiver group 806 of the chip 802. The transceiver groups 804 and 806 may have an architecture the same or similar to the transceiver group 400 or 402 of FIG. 5. In some embodiments, the router 700 of FIG. 7 may be further disposed between the transceiver groups 804 and 806 if there is a certain need for data steam allocation at the receiving end. In some embodiments, the transceiver groups 804 and 806 may have an architecture the same or similar to the transceiver group 600 or 602 of FIG. 6, and the router 604 is disposed between the transceiver groups 804 and 806.

Figure 9:
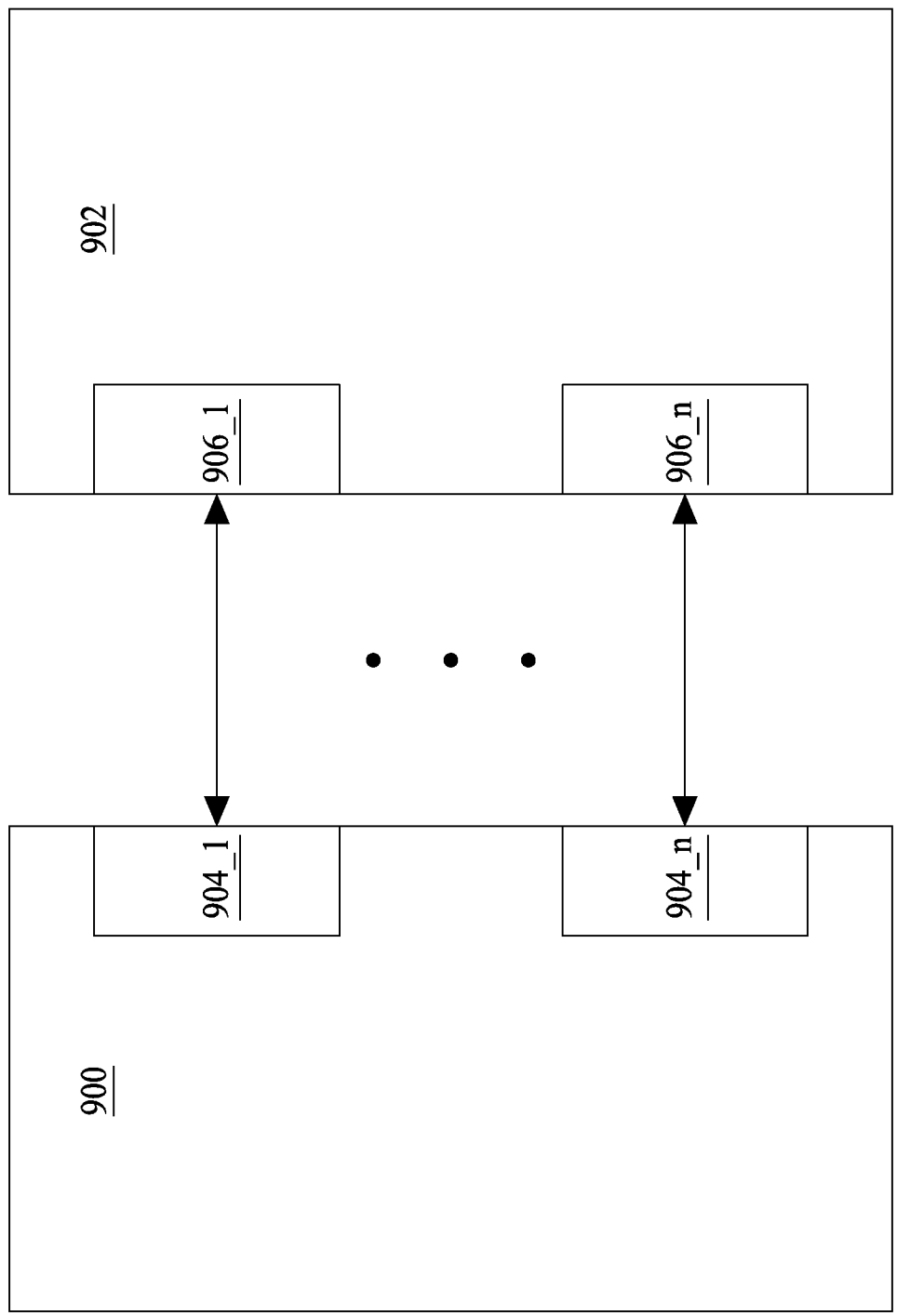
FIG. 9 is a schematic view illustrating a chip communicates with another chip through transceiver groups according to another embodiment of the present disclosure.

When the number of data streams is not enough for the chips 800 and 802, the size of the transceiver groups employed may be increased, or the number of the transceiver groups may be increased. FIG. 9 is a schematic view illustrating a chip 900 communicates with another chip 902 through transceiver groups 904_1-904_n and 906_1-906_n according to another embodiment of the present disclosure. The chip 900 includes the transceiver groups 904_1-904_n coupled to the transceiver groups 906_1-906_n of the chip 902 respectively. Details of alternative design of each transceiver groups and/or router are the same or similar to FIG. 8, thus related descriptions are omitted.

Figure 10:
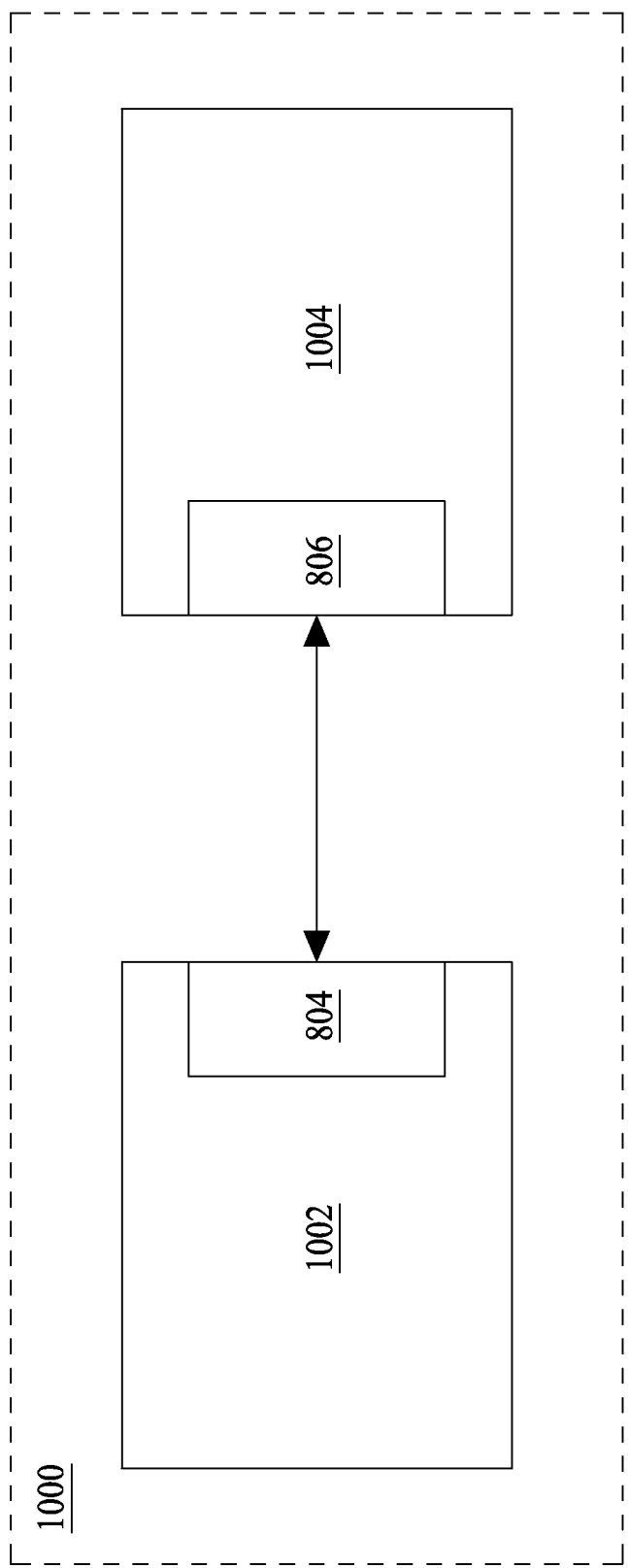
FIG. 10 is a schematic view illustrating a circuit block communicates with another circuit block through transceiver groups according to an embodiment of the present disclosure.

FIG. 10 is a schematic view illustrating a circuit block 1002 communicates with another circuit block 1004 through transceiver groups 804 and 806 according to an embodiment of the present disclosure. The circuit blocks 1002 and 1004 may be implemented in a same die of a chip 1000. In some embodiments, the circuit blocks 1002 and 1004 may be implemented in different dies of the chip 1000 in a form of 2.5D or 3D IC. The circuit block 1002 or 1004 may be a memory block, a processor, or other circuit modules. The circuit block 1002 includes the transceiver group 804 coupled to the transceiver group 806 of the circuit block 1004. The transceiver groups 804 and 806 may have an architecture the same or similar to the transceiver group 400 or 402 of FIG. 5. In some embodiments, the router 700 of FIG. 7 may be further disposed between the transceiver groups 804 and 806 if there is a certain need for data steam allocation at the receiving end. In some embodiments, the transceiver groups 804 and 806 may have an architecture the same or similar to the transceiver group 600 or 602 of FIG. 6, and the router 604 is disposed between the transceiver groups 804 and 806.

Figure 11:
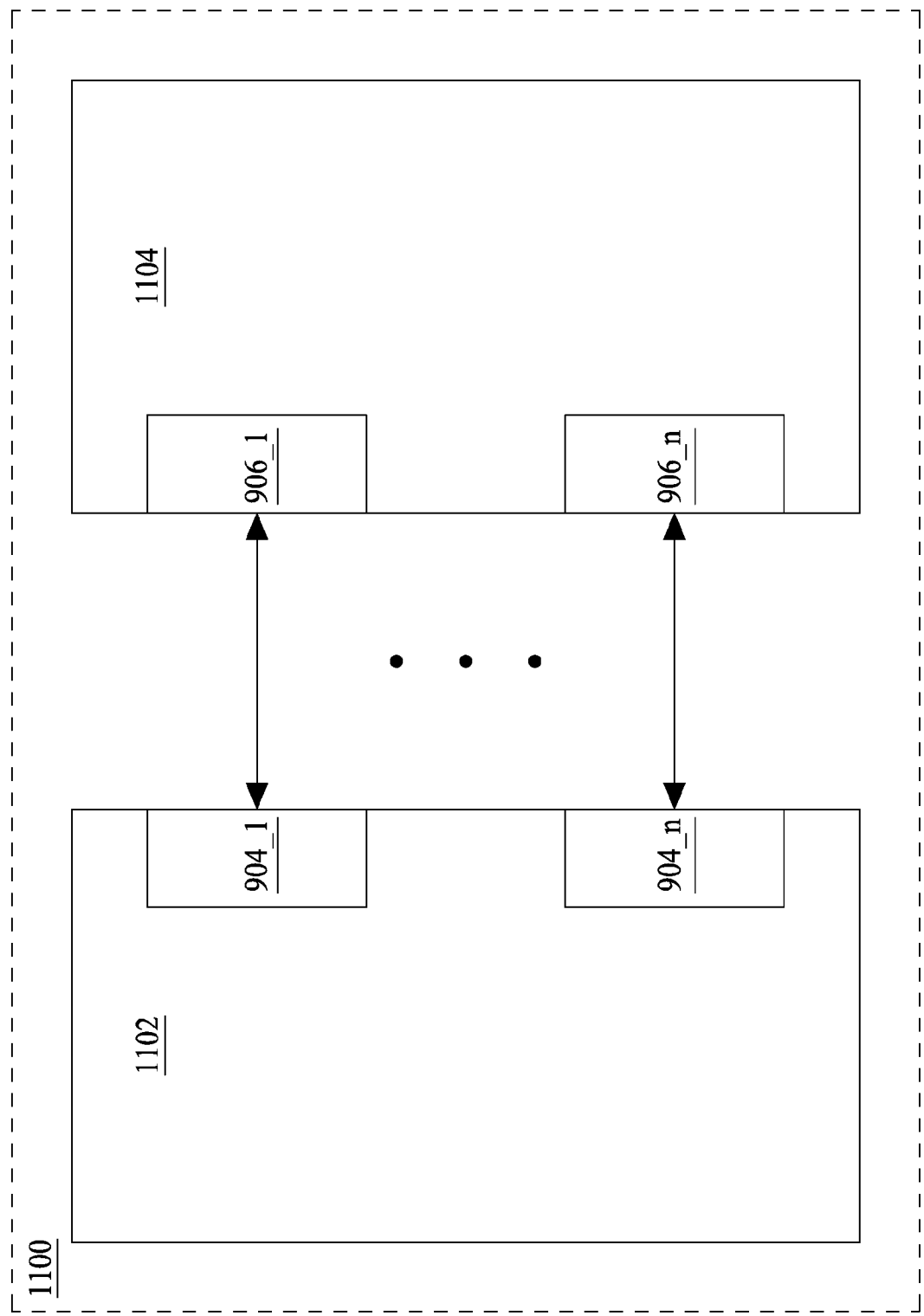
FIG. 11 is a schematic view illustrating a circuit block communicates with another circuit block through transceiver groups according to another embodiment of the present disclosure.

When the number of data streams is not enough for the circuit block 1002 and 1004, the size of the transceiver groups employed may be increased, or the number of the transceiver groups may be increased. FIG. 11 is a schematic view illustrating a circuit block 1102 communicates with another circuit block 1102 through transceiver groups 904_1-904_n and 906_1-906_n according to another embodiment of the present disclosure. The circuit blocks 1102 and 1104 may be implemented in a same die of a chip 1100. In some embodiments, the circuit blocks 1102 and 1104 may be implemented in different dies of the chip 1100 in a form of 2.5D or 3D IC. The circuit block 1102 or 1104 may be a memory block, a processor, or other circuit modules. The circuit block 1102 includes the transceiver groups 904_1-904_n coupled to the transceiver groups 906_1-906_n of the circuit block 1104 respectively. Details of alternative design of each transceiver groups and/or router are the same or similar to FIG. 10, thus related descriptions are omitted.

Figure 12:
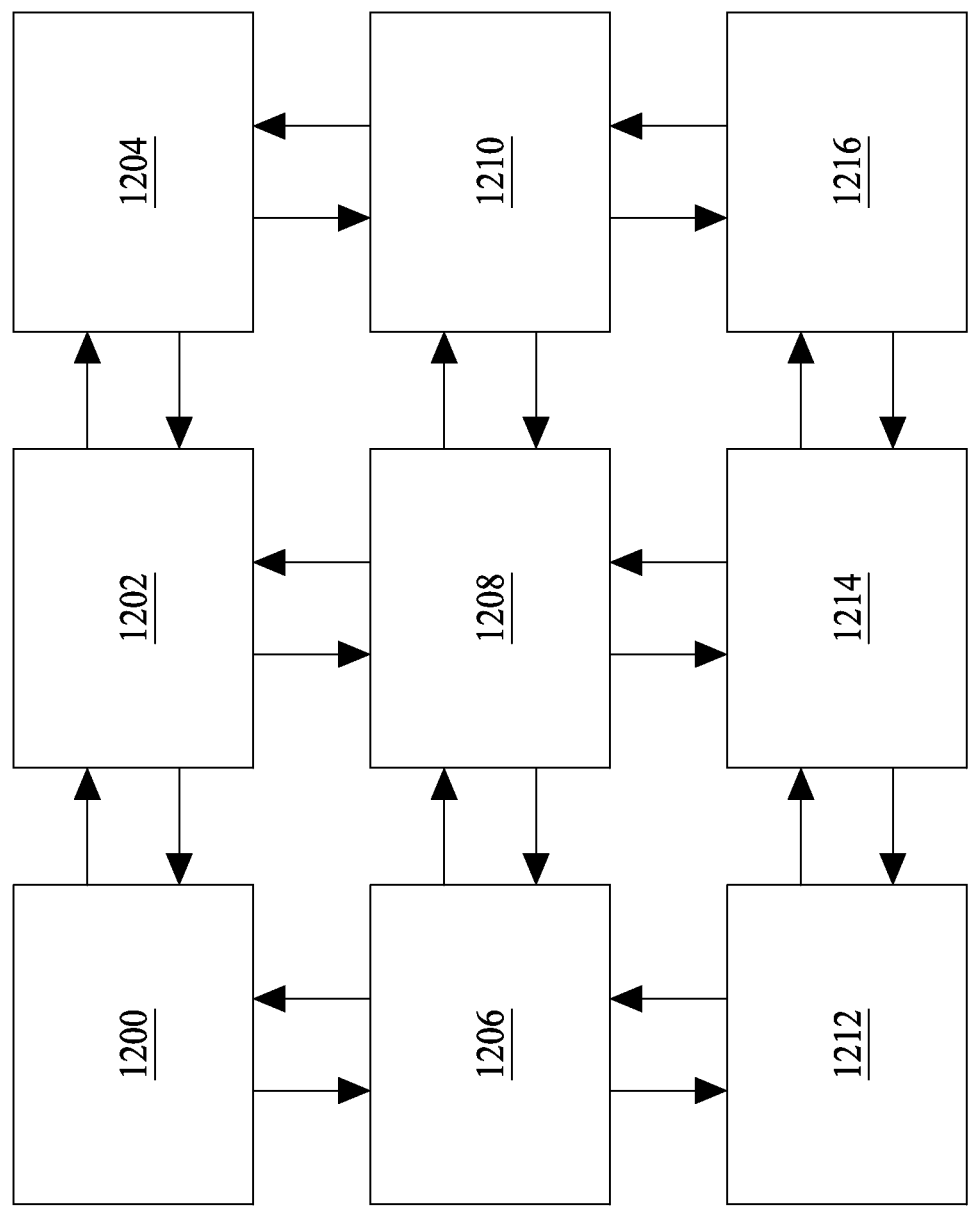
FIG. 12 is a schematic view illustrating a configuration of connection for plurality of transceiver groups according to an embodiment of the present disclosure.

FIG. 12 is a schematic view illustrating a configuration of connection for a plurality of transceiver groups according to an embodiment of the present disclosure. In FIG. 12, transceiver groups 1200-1216 may have an architecture the same or similar to the transceiver group 400 or 402 of FIG. 5. Each of transceiver groups 1200-1216 is connected with adjacent transceiver groups in two directions. When one of the transceiver groups 1200-1216 transmits data streams to a target transceiver group which is not adjacent thereto, the data streams can still arrive at the target transceiver group by passing through at least one other intermediate transceiver group. For example, the transceiver group 1200 can transmit data streams to the transceiver group 1216 through the transceiver groups 1202, 1208, and 1210; and the transceiver group 1216 may return data streams to the transceiver 1200 through the transceiver groups by using a path different from the transceiver groups 1202, 1208, and 1210.

Figure 13:
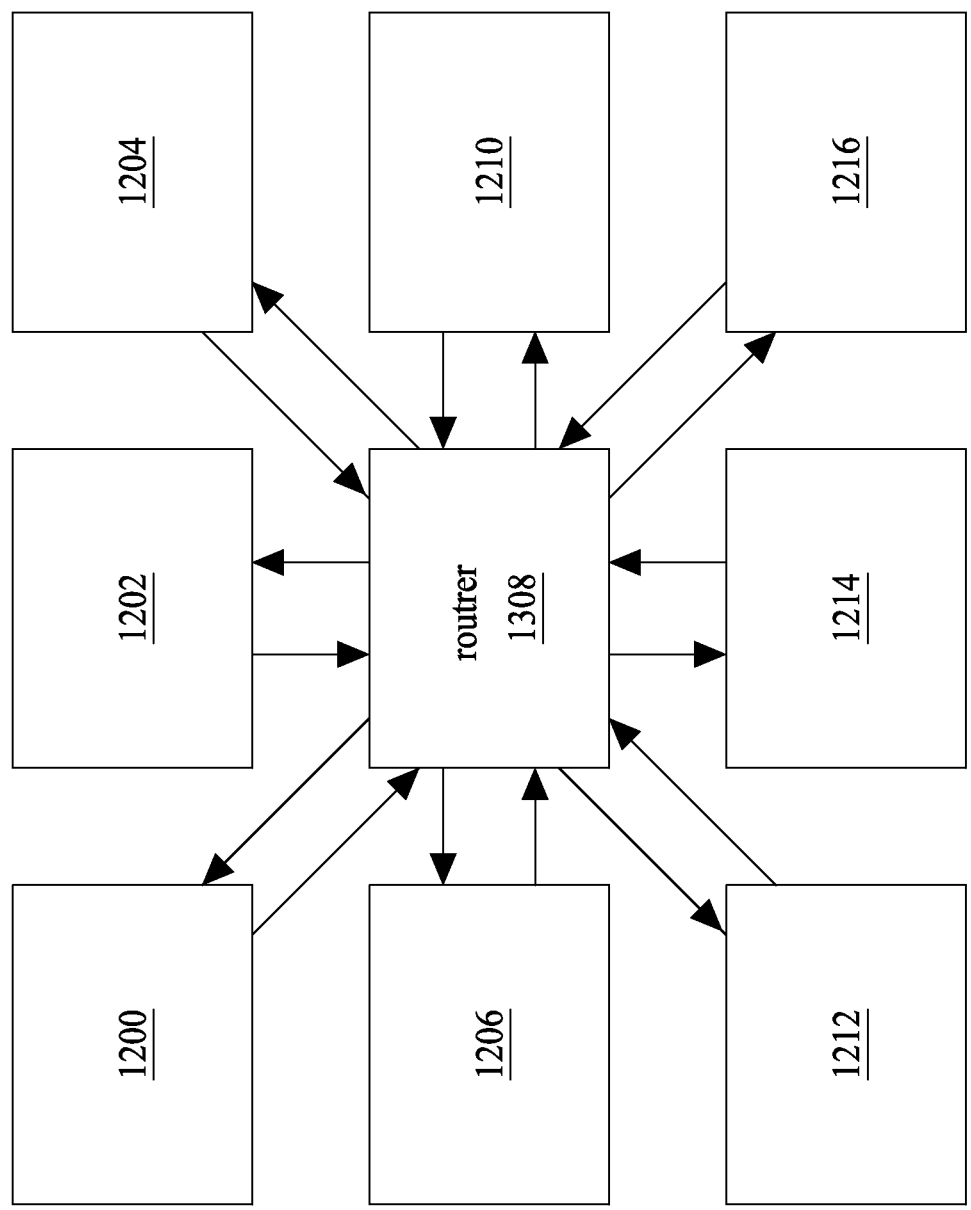
FIG. 13 is a schematic view illustrating a configuration of connection for plurality of transceiver groups according to another embodiment of the present disclosure.

FIG. 13 is a schematic view illustrating a configuration of connection for plurality of transceiver groups according to another embodiment of the present disclosure. In FIG. 13, the configuration is similar to FIG. 12 except the transceiver group 1208 of FIG. 12 is replaced by a router 1308. The router 1308 may be the same or similar to the router 700 shown in FIG. 7, and the transceiver groups 1200-1216 may have an architecture the same or similar to the transceiver group 400 or 402 of FIG. 5. In some embodiments, the router 1308 may be the same or similar to the router 600 shown in FIG. 6, and the transceiver groups 1200-1216 may have an architecture the same or similar to the transceiver group 600 or 602 of FIG. 6. Each of transceiver groups 1200-1216 is connected to the router 1308 in two directions. When one of the transceiver groups 1200-1216 transmits data streams to a target transceiver group among the transceiver groups 1200-1216, the data streams can arrive at the target transceiver group by passing through the router 1308. The configuration of FIG. 13 may possess a lower transmission latency time as compared with FIG. 12.

Figure 14:
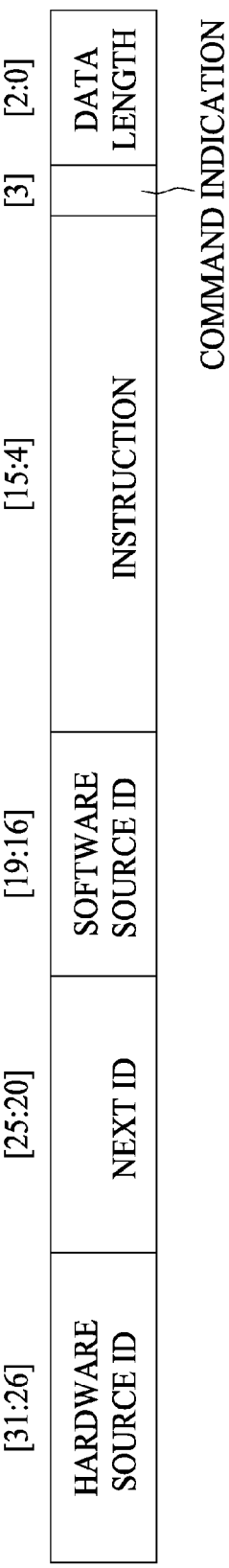
FIG. 14 is a diagram illustrating an exemplary packet according to an embodiment of the present disclosure.

The transceiver group of the present disclosure may be included in a transceiver system. Through a predefined protocol, a plurality of transceiver systems can communicate with each other. The predefined protocol may include a specified packet with a predetermined format. An exemplary packet is illustrated in FIG. 14. The packet includes at least 32 bits and may be transmitted in serial through the transceiver group for requesting or responding a specified operation.

The packet shown in FIG. 14 includes bits [31:26] representing a hardware identification (ID) of a source transceiver system of a request or a response operation. The bits [25:20] include an ID of a next transceiver system where the packet should be transmitted. The next transceiver system may be a final destination or an intermediate station. The bits [19:16] are reserved for a software ID field to indicate a software ID within the source transceiver system. The bits [15:4] indicate an instruction of a current operation. The instruction may include a method of transmission and a type of the current operation. For example, the method of transmission includes to pass along to a final destination or to broadcast to all connected transceiver systems. The type of the current operation may include a reset operation, a request operation, or a response operation. A bit [3] is used to indicate whether the packet includes further command fields following the first 32-bits [31:0]. The command fields may be used to store any command with a specified format according to the predefined protocol. Bits [2:0] are used to indicate a total length of a data payload, if any.

Figure 15:
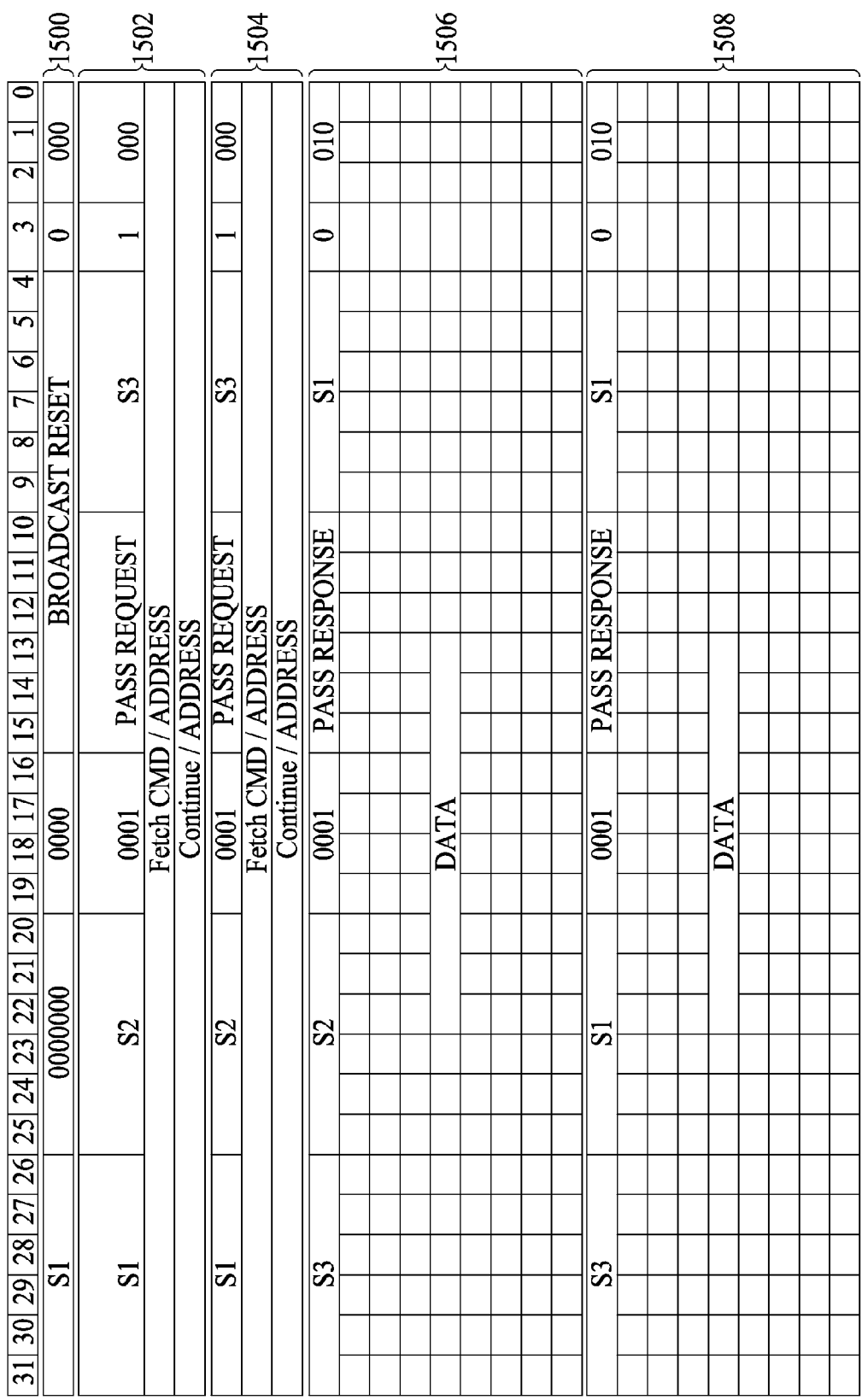
FIG. 15 is a diagram illustrating a packet sequence for a specified command according to an embodiment of the present disclosure.

FIG. 15 is a diagram illustrating a packet sequence for a specified command according to an embodiment of the present disclosure. The total sequence is achieved by packets 1500-1508. Firstly, the transceiver system S1 initiates the sequence by sending a broadcast packet 1500 to reset all the transceiver systems which are connected to the transceiver system S1. Since the broadcast packet 1500 has no further command fields and data payload, the bit [3] and bits [2:0] are set to 0. Thereafter, the transceiver system S1 starts to send a fetch command packet 1502 to a transceiver system S3 through a transceiver system S2. Once the transceiver system S2 has received the fetch command packet 1502, the transceiver system S2, as an intermediate station, resends the fetch command to the transceiver system S3. A fetch command packet 1504 sent to the transceiver system S3 is almost identical to the fetch command packet 1502 except the bits [25:20] is changed from an ID of the transceiver system S2 to an ID of the transceiver system S3.

The transceiver system S3 receives the packet 1504 and responses by sending back a packet with data payload 1506 to the transceiver system S1 along the same route, i.e. through the transceiver system S2. The intermediate state S2 once again passes the data payload included in a packet 1508 to the transceiver system S1.

Figure 16:
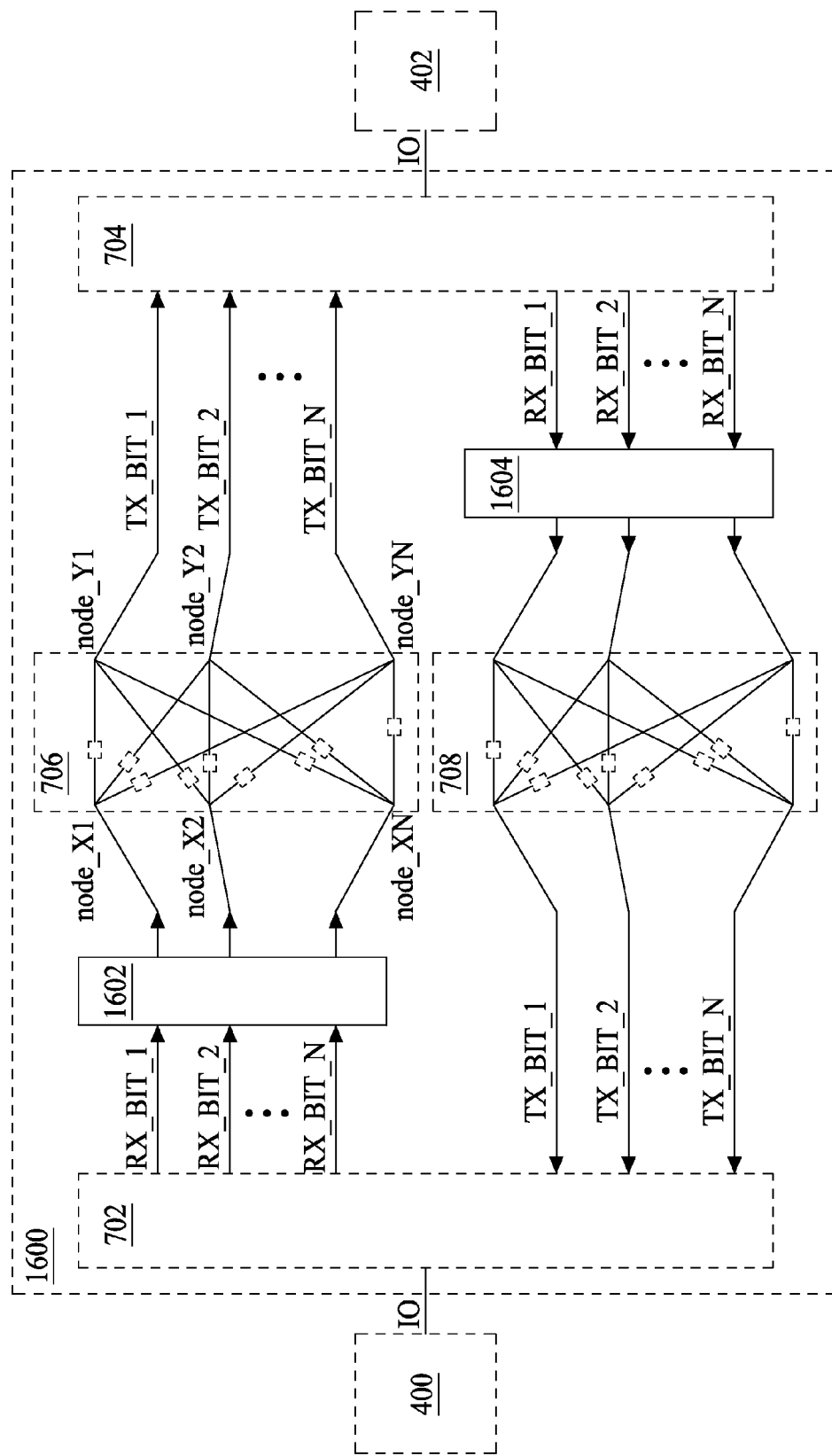
FIG. 16 is a schematic view illustrating a transceiver group connected to another transceiver group through a router according to still another exemplary embodiment of the present disclosure.

In order to more efficiently utilize the throughput capacity of each transceiver system, a router including a serializing-deserializing mechanism is disclosed. FIG. 16 is a schematic view illustrating a transceiver group 400 connected to another transceiver group 402 through a router 1600 according to still another exemplary embodiment of the present disclosure. As can be seen in FIG. 16, the transceiver group 400 of FIG. 4 is connected to another transceiver group 402 via the router 1600. The architecture of the transceiver group 402 is similar to the architecture of the transceiver group 400. Suppose that a data rate of each data stream of transceiver group 400 is 500 Mbits/s; and a data rate of each data stream of transceiver group 402 is 2 Gbits/s. In this embodiment, the router 1600 includes transceivers 702 and 704, serializing-deserializing circuits 1602 and 1604, and N*N switch matrixes 706 and 708, wherein N is an integer. In this embodiment, N equals to the number of data streams of the full ability of the transceiver groups 400 and 402.

The router 1600 is a two-port router. However, this is not a limitation of the present disclosure. One skilled in the art can apply the principles of the present disclosure to other router applications as well without departing from the scope of the disclosure. In some embodiments, a router may have more sets of the transceivers 702 and 704, the N*N switch matrixes 706 and 708, and the serializing-deserializing circuits 1602 and 1604 so as to perform a multi-port operation.

The architecture of the transceiver 702 and 704 is similar to the architecture of the transceiver 300. Suppose input data streams need to be transmitted from the transceiver group 400 to the transceiver group 402. Undoubtedly, the input data streams having a data rate of 500 Mbits/s sent from the transceiver group 400 can be successfully received by the transceiver group 402, but the efficiency and utilization of the transceiver group 402 in this case is low since the maximum data rate of each receivable data stream is 2 Gbits/s for the the transceiver group 402. In order to improve the utilization of the transceiver group 402, the serializing-deserializing circuit 1602 is employed, and the utilization of the transceiver group 402 can be at most 4 times improved. Details are described as follows.

The transceiver 702 receives interface signal IO from the transceiver group 400. The transceiver 702 demodulates the interface signal IO received from the transceiver group 400 and generates data streams RX_BIT_1-RX_BIT_N based on the received interface signal IO from the transceiver group 400. In this embodiment, each of the data streams RX_BIT_1-RX_BIT_N has a data rate of 500 Mbits/s. The serializing-deserializing circuit 1602 can be controlled to adjust the data rate of the sender (i.e. the transceiver group 400) according to the data rate of the receiver (i.e. transceiver group 402).

Because the data rate of each data stream of the transceiver group 402 is four times the data rate of each data stream of the transceiver group 400. The serializing-deserializing circuit 1602 can merge at most 4 data streams together so as to produce a data stream having a 4 times data rate. The concept is like 4-to-1 serializing. In this way, the N data streams of the transceiver group 400 can be reduce to N/4 data streams. The N/4 data streams can be allocated to the transceiver 704 through the N*N switch matrix 706.

The N*N switch matrix 706 includes N*N paths, wherein each path has a switch that can operatively activate or deactivate the corresponding path. The data streams RX_BIT_1-RX_BIT_N are connected to nodes node_X1-node_XN of the N*N switch matrix 706, and can be reallocated by configuration of the N*N switch matrix 706. For example, the RX_BIT_1 may be reassigned to a node node_Y2 by activating the switch on the path between the node_X1 and node_Y2 and deactivating all the remaining paths connected to the node_X1.

For example, through a specified allocation by the N*N switch matrix 706, only data streams TX_BIT_1-TX_BIT_(N/4) are assigned to receive the data streams RX_BIT_1-RX_BIT_N. As such, at most three-fourth of the throughput of the transceiver group 402 can be saved. The saved capacity can be used to receive one or more other data streams from one or more transceiver groups other than the transceiver group 400 when the router 1600 has more ports.

When input data streams need to be transmitted from the transceiver group 402 to the transceiver group 400, the data rate of the data streams comes from the transceiver group 402 has to be reduced to suit the maximum data rate of the data streams of the transceiver group 400. For example, when a 2 Gbits/s data stream RX_BIT_1 needs to be transmitted to the transceiver group 400, the serializing-deserializing circuit 1604 can deserialize the 2 Gbits/s data stream RX_BIT_1 to four 500 Mbits/s data streams. The four data streams with reduced data rate then can be allocated to any four of the data streams TX_BIT_1-TX_BIT_N by the N*N switch matrix 708.

In some embodiments, only one of the N*N switch matrix 706 and the N*N switch matrix 708 is employed and both transmission direction can be also achieved by sharing a single N*N switch matrix.

The router 1600 is flexible and useful when transceiver groups coupled thereto have different maximum data rate capabilities or different throughput capacities. Two or more data streams can be serialized to one data stream, or one data stream can be deserialized to two or more data streams. Thus the utilization of the transceiver group with a higher throughput can be improved.

Some embodiments of the present disclosure provide a transceiver group, including: a plurality of transceivers; wherein the transceiver group performs transmission and receiving through a wire, and each of the transceivers includes a transmitter and a receiver, and the transmitter includes: a carrier generator arranged to generate a plurality of carriers having different frequencies for a plurality of data streams to be transmitted; a modulator, coupled to the data streams to be transmitted and the carrier generator, to generate a plurality of modulated data streams carried on the plurality of carriers; and a summer arranged to merge the plurality of modulated data streams to an output signal to the wire; and the receiver includes: a carrier generator arranged to generate a plurality of carriers having different frequencies for an input signal received from the wire; and a demodulator, coupled to the input signal and the carrier generator, to generate a plurality of demodulated data streams.

In some embodiments of the present disclosure, the modulator is a Quadrature Amplitude Modulation (QAM) modulator, and the demodulator is a QAM demodulator.

In some embodiments of the present disclosure, the wire is a differential pair.

In some embodiments of the present disclosure, each of the transceivers includes a switch for selectively coupling the input signal or the output signal to the wire.

In some embodiments of the present disclosure, the transceiver group further includes a plurality of switches coupled between the plurality of transceivers and the wire.

Some embodiments of the present disclosure provide a router, including: a first transceiver; a second transceiver; a first switch matrix coupled between the first transceiver and the second transceiver; and a second switch matrix coupled between the first transceiver and the second transceiver; wherein each of the first transceiver and the second transceiver includes a transmitter and a receiver.

In some embodiments of the present disclosure, the transmitter includes: a carrier generator arranged to generate a plurality of carriers having different frequencies for a plurality of data streams to be transmitted; a modulator, coupled to the data streams to be transmitted and the carrier generator, to generate a plurality of modulated data streams carried on the plurality of carriers; and a summer arranged to merge the plurality of modulated data streams to an output signal to a wire; and the receiver includes: a carrier generator arranged to generate a plurality of carriers having different frequencies for an input signal received from the wire; and a demodulator, coupled to the input signal and the carrier generator, to generate a plurality of demodulated data streams; and the first switch matrix selectively couples each of the demodulated data streams of the first transceiver to the data streams to be transmitted of the second transceiver; and the second switch matrix selectively couples each of the demodulated data streams of the second transceiver to the data streams to be transmitted of the first transceiver.

In some embodiments of the present disclosure, the modulator is a Quadrature Amplitude Modulation (QAM) modulator, and the demodulator is a QAM demodulator.

In some embodiments of the present disclosure, the wire is a differential pair.

In some embodiments of the present disclosure, each of the first transceiver and the second transceiver includes a switch for selectively coupling the input signal or the output signal to the wire.

Some embodiments of the present disclosure provide a router, including: a first transceiver; a second transceiver; a first serializing-deserializing circuit coupled between the first transceiver and the second transceiver; a second serializing-deserializing circuit coupled between the first transceiver and the second transceiver; wherein each of the first transceiver and the second transceiver includes a transmitter and a receiver.

In some embodiments of the present disclosure, the transmitter includes: a carrier generator arranged to generate a plurality of carriers having different frequencies for a plurality of data streams to be transmitted; a modulator, coupled to the data streams to be transmitted and the carrier generator, to generate a plurality of modulated data streams carried on the plurality of carriers; and a summer arranged to merge the plurality of modulated data streams to an output signal to the wire; and the receiver includes: a carrier generator arranged to generate a plurality of carriers having different frequencies for an input signal received from the wire; and a demodulator, coupled to the input signal and the carrier generator, to generate a plurality of demodulated data streams.

In some embodiments of the present disclosure, the first serializing-deserializing circuit or the second serializing-deserializing circuit performs serialization upon N of the plurality of demodulated data streams to generate one of the plurality of data streams to be transmitted, wherein N is an integer greater than 1.

In some embodiments of the present disclosure, the data rate of the serialized one of the plurality of data streams is N times the data rate of each of the N demodulated data streams.

In some embodiments of the present disclosure, the first serializing-deserializing circuit or the second serializing-deserializing circuit performs deserialization upon one of the plurality of demodulated data streams to generate N of the plurality of data streams to be transmitted, wherein N is an integer greater than 1.

In some embodiments of the present disclosure, the data rate of the one demodulated data streams is N times the data rate of each of the N deserialized data streams.

In some embodiments of the present disclosure, the router further includes a first switch matrix coupled between the first serializing-deserializing circuit and the second transceiver; and a second switch matrix coupled between the first transceiver and the second serializing-deserializing circuit; wherein the first switch matrix selectively couples each of the serializing-deserializing data streams of the first serializing-deserializing circuit to the data streams to be transmitted of the second transceiver; and the second switch matrix selectively couples each of the serializing-deserializing data streams of the second serializing-deserializing circuit to be transmitted of the first transceiver.

In some embodiments of the present disclosure, the modulator is a Quadrature Amplitude Modulation (QAM) modulator, and the demodulator is a QAM demodulator.

In some embodiments of the present disclosure, the wire is a differential pair.

In some embodiments of the present disclosure, each of the first transceiver and the second transceiver comprises a switch for selectively coupling the input signal or the output signal to the wire.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transceiver group, comprising:
a plurality of transceivers;
wherein the transceiver group performs transmission and receiving through a same wire, and each of the transceivers includes a transmitter and a receiver, and
the transmitter includes:
a carrier generator arranged to generate a plurality of carriers having different frequencies for a plurality of data streams to be transmitted;
a modulator, coupled to the data streams to be transmitted and the carrier generator, to generate a plurality of modulated data streams carried on the plurality of carriers; and
a summer arranged to merge the plurality of modulated data streams to an output signal to the wire; and
the receiver includes:
a carrier generator arranged to generate a plurality of carriers having different frequencies for an input signal received from the wire; and
a demodulator, coupled to the input signal and the carrier generator, to generate a plurality of demodulated data streams;
wherein the transceiver group further comprises a plurality of switches, and each of the plurality of switches is coupled between a corresponding transceiver of the plurality of transceivers and the same wire.

2. The transceiver group of claim 1, wherein the modulator is a Quadrature Amplitude Modulation (QAM) modulator, and the demodulator is a QAM demodulator.

3. The transceiver group of claim 1, wherein the wire is a differential pair.

4. A router, comprising:
a first transceiver including a plurality of receiving data ports and a plurality of transmitting data ports;
a second transceiver including a plurality of receiving data ports and a plurality of transmitting data ports;
a first switch matrix coupled between the first transceiver and the second transceiver, wherein the first switch matrix includes a plurality of switches for selectively coupling each of the receiving data ports of the first transceiver to each of the transmitting data ports of the second transceiver respectively;

a second switch matrix coupled between the first transceiver and the second transceiver, wherein the second switch matrix includes a plurality of switches for selectively coupling each of the transmitting data ports of the first transceiver to each of the receiving data ports of the second transceiver respectively;

a first serializing-deserializing circuit coupled between the first transceiver and the first switch matrix; and a second serializing-deserializing circuit coupled between the second transceiver and the second switch matrix;

wherein each of the first transceiver and the second transceiver includes a transmitter and a receiver.

5. The router of claim 4, wherein the transmitter includes:

a carrier generator arranged to generate a plurality of carriers having different frequencies for a plurality of data streams to be transmitted;

a modulator, coupled to the data streams to be transmitted and the carrier generator, to generate a plurality of modulated data streams carried on the plurality of carriers; and a summer arranged to merge the plurality of modulated data streams to an output signal to a wire; and the receiver includes:

a carrier generator arranged to generate a plurality of carriers having different frequencies for an input signal received from the wire; and a demodulator, coupled to the input signal and the carrier generator, to generate a plurality of demodulated data streams; and the first switch matrix selectively couples each of the demodulated data streams of the first transceiver to the data streams to be transmitted of the second transceiver; and the second switch matrix selectively couples each of the demodulated data streams of the second transceiver to the data streams to be transmitted of the first transceiver.

6. The router of claim 5, wherein the modulator is a Quadrature Amplitude Modulation (QAM) modulator, and the demodulator is a QAM demodulator.

7. The router of claim 5, wherein the wire is a differential pair.

8. The router of claim 7, wherein each of the first transceiver and the second transceiver comprises a switch for selectively coupling the input signal or the output signal to the wire.

9. A router, comprising:

a first transceiver;

a second transceiver coupled to the first transceiver;

a first switch matrix;

a second switch matrix;

a first serializing-deserializing circuit coupled between the first transceiver and the first switch matrix; and a second serializing-deserializing circuit coupled between the second transceiver and the second switch matrix;

wherein the second transceiver is coupled to the first transceiver through the first switch matrix and the second switch matrix, and each of the first transceiver and the second transceiver includes a transmitter and a receiver, and the transmitter includes:

a carrier generator arranged to generate a plurality of carriers having different frequencies for a plurality of data streams to be transmitted;

a modulator, coupled to the data streams to be transmitted and the carrier generator, to generate a plurality of modulated data streams carried on the plurality of carriers; and a summer arranged to merge the plurality of modulated data streams to an output signal to the wire; and the receiver includes:

a carrier generator arranged to generate a plurality of carriers having different frequencies for an input signal received from the wire; and a demodulator, coupled to the input signal and the carrier generator, to generate a plurality of demodulated data streams.

10. The router of claim 9, wherein the first serializing-deserializing circuit or the second serializing-deserializing circuit performs serialization upon N of the plurality of demodulated data streams to generate one of the plurality of data streams to be transmitted, wherein N is an integer greater than 1.

11. The router of claim 10, wherein the data rate of the serialized one of the plurality of data streams is N times the data rate of each of the N demodulated data streams.

12. The router of claim 9, wherein the first serializing-deserializing circuit or the second serializing-deserializing circuit performs deserialization upon one of the plurality of demodulated data streams to generate N of the plurality of data streams to be transmitted, wherein N is an integer greater than 1.

13. The router of claim 12, wherein the data rate of the one demodulated data streams is N times the data rate of each of the N deserialized data streams.

14. The router of claim 9, wherein the first switch matrix selectively couples each of the serializing-deserializing data streams of the first serializing-deserializing circuit to the data streams to be transmitted of the second transceiver; and the second switch matrix selectively couples each of the serializing-deserializing data streams of the second serializing-deserializing circuit to be transmitted of the first transceiver.

15. The router of claim 9, wherein the modulator is a Quadrature Amplitude Modulation (QAM) modulator, and the demodulator is a QAM demodulator.

16. The router of claim 9, wherein the wire is a differential pair.

17. The router of claim 9, wherein each of the first transceiver and the second transceiver comprises a switch for selectively coupling the input signal or the output signal to the wire.

18. The transceiver group of claim 1, wherein one ends of the switches are directly connected together.

19. The transceiver group of claim 1, wherein one ends of the switches are directly connected to the same wire.

20. The transceiver group of claim 1, wherein a number of the plurality of switches equal to a number of the plurality of transceivers.

* * * * *